United States Patent [19]
Tang et al.

[11] Patent Number: 5,791,671
[45] Date of Patent: Aug. 11, 1998

[54] PRELOADING AND CABLE ROUTING ASSEMBLY AND ROTATABLE BRAKE CABLE COUPLING SYSTEM

[75] Inventors: Richard Tang; Robert Valdez, both of Carson, Calif.

[73] Assignee: Bear Corporation, Carson, Calif.

[21] Appl. No.: 526,108

[22] Filed: Sep. 8, 1995

[51] Int. Cl.⁶ ............................................. B62K 21/18
[52] U.S. Cl. ..................... 280/264; 280/274; 74/502.4; 74/502.6
[58] Field of Search ........................ 280/264, 279, 280/280, 274, 288.4; 188/24.11, 2 D; 74/502.2, 489, 502.4, 502.6, 501.5 R, 500.5, 551.1

[56] References Cited

U.S. PATENT DOCUMENTS

| | | | |
|---|---|---|---|
| 4,223,563 | 9/1980 | Kine | 280/288.4 |
| 4,616,523 | 10/1986 | Jones | 280/264 |
| 4,653,768 | 3/1987 | Keys et al. | 74/551.1 |
| 4,753,448 | 6/1988 | Nagashima | 280/264 |
| 4,770,435 | 9/1988 | Cristie | 74/551.1 |
| 5,319,993 | 6/1994 | Chiang | 280/279 |
| 5,605,076 | 2/1997 | Wu | 280/279 |

FOREIGN PATENT DOCUMENTS 084322  10/1975  Taiwan .

*Primary Examiner*—Brian L. Johnson
*Assistant Examiner*—Gary Savitt
*Attorney, Agent, or Firm*—Charles H. Thomas

[57] ABSTRACT

A free-style bicycle is modified to accommodate a threadless headset by constructing the preloading assembly employed with a threadless headset as a cable routing assembly so that at least the inextensible core of the front brake cable is routed down through the preloading and cable routing assembly and through the hollow steering tube of a bicycle. The preloading assembly has a longitudinal passageway defined therethrough. The passageway may be formed by utilizing a hollow draw bolt that permits the passage of the core of the front brake cable therethrough. In this case the sheath of the front brake cable is divided into upper and lower segments. The upper sheath segment extends between the front brake control and the top of the preloading and cable routing assembly, while the lower sheath segment extends from a lower steering tube end plug to the front wheel brake. Alternatively, the preloading and cable routing assembly is provided with a hollow wedging structure that defines a longitudinal passageway therethrough. In this embodiment the passageway can be of a diameter large enough to accommodate not only the front brake cable core but the surrounding front brake cable sheath as well. This obviates the necessity for dividing the sheath into upper and lower segments.

11 Claims, 8 Drawing Sheets

PRELOADING AND CABLE ROUTING ASSEMBLY AND ROTATABLE BRAKE CABLE COUPLING SYSTEM

BACKGROUND OF THE INVENTION

1. Field of the Invention

The present invention relates to a system which allows a free-style bicycle employing a rotatable brake cable coupling system to be utilized with a bicycle having a threadless steering tube and employing a preloading and cable routing assembly.

2. Description of the Prior Art

A conventional bicycle employs a frame upon which the seat, rear wheel, pedals, and drive transmission mechanism are mounted, and a steering assembly rotatably mounted relative to the frame. The major components of a bicycle steering assembly include a front wheel, a front wheel fork, a steering tube, a handlebar stem, and a set of handlebars. The steering assembly can be turned at an angle relative to the frame about an axis of rotation extending along the center of the steering tube of the steering assembly and the center of the head tube of the frame. The steering tube is mounting coaxially within the head tube and turns relative thereto on steering bearings interposed therebetween.

A number of years ago a rotatable brake cable coupling system was devised for use on a bicycle which allowed a rider to completely rotate the steering assembly of a bicycle as a unit relative to the bicycle frame on a bicycle having hand brakes. Prior to this time such a manipulation was not possible since the bicycle brake cables extending from the hand brake controls on the handlebars to the brake calipers of the brakes on the front and rear wheels of a bicycle would permit only limited rotation of the steering assembly relative to the frame to an arc of far less than 360 degrees.

However, a rotatable brake cable coupling system allows the front wheel, front wheel fork, steering tube, and handlebars of a bicycle to be rotated together through repeated 360-degree revolutions relative to the bicycle head tube and bicycle frame. This feature allows riders to perform stunts while only the rear wheel of the bicycle is in contact with the riding surface. A bicycle having this capability is known in the industry as a "free-style" bicycle.

One embodiment of a rotatable brake cable coupling system is described in Patent No. 084,322 issued in the Republic of China (Taiwan). Such a rotatable brake coupling system is sold commercially as the Gyro rotatable brake coupling system by Bear Corporation located at 17101 So. Central Avenue, No. G, Carson, Calif. 90746.

In a conventional rotatable brake cable coupling system the rear brake cable is divided into two segments, namely a lower operating segment and an upper control segment. The lower operating segment has a single brake operating end termination and a pair of control coupling end terminations. The single brake operating end termination is secured to the rear brake, while the pair of control coupling end terminations extend along the frame and up the outside of the head tube at the front of the frame to a lower cable stop. The lower cable stop is formed with a pair of diametrically opposed brake cable termination ears that are fixed relative to the bicycle frame head tube. The cable sheaths of the control coupling end terminations of the lower, operating segment of the rear brake cable are secured to the bicycle head tube by means of connections to the fixed brake cable termination ears while the control coupling end terminations of the rear brake cable operating segment core element extend upwardly from the sheath terminations and are connected to the nonrotatable portion of an annular rotor.

The upper or control segment of the rear brake cable likewise has a single brake control end termination that is connected to a rear hand brake control mounted on one of the handlebars of the bicycle. The upper, control segment of the rear brake cable extends downwardly from the handlebars and terminates in a pair of operating end coupling terminations. The control segment sheath element of the upper or control rear brake cable segment is fastened to a pair of diametrically opposed upper brake cable termination ears that are secured to the steering tube of the bicycle. The core member components of the upper, control segment of the rear brake cable extend downwardly past the terminations of the sheath members in which they are disposed and are secured to the rotatable portion of the rotatable brake cable coupling system rotor.

The nonrotatable and rotatable portions of the rotor each include a bearing race between which a number of ball bearings are arranged in an annular ring about the head tube of the bicycle frame. The rotatable portion of the rotor turns in rotation with the steering tube but can move in longitudinal reciprocation relative thereto. The rotatable portion of the rotor is carried in rotation with the steering tube by virtue of the connection of the cable sheath operating end coupling terminations of the upper cable control segment to the upper brake cable termination ears and by the connection of the core elements of the cable control segment to the rotatable portion of the rotor. The control coupling end terminations of the operating segment are prevented from rotating relative to the head tube by virtue of the connection of the sheath elements thereof to the lower fixed brake cable termination ears and the connection of the core elements thereof to the nonrotatable rotor portion.

The operation of the hand brake control that controls the rear wheel brake places tension on the inextensible core elements of the cable control segment of the rear brake cable. This draws both the rotatable and nonrotatable portions of the rotor upwardly toward the handlebars in longitudinal reciprocation relative to both the steering tube and the head tube. Since the nonrotatable portion of the rotor is coupled to the rotatable portion thereof through the overhanging arrangement of the bear races, the entire rotor assembly is drawn upwardly. This transmits the tensile force from the core elements of the upper, cable control segment of the rear brake cable to the core elements of the lower, operating segment of the rear brake cable. This tensile force in turn operates the calipers of the rear brake.

The steering tube of many bicycle models is externally threaded at its upper extremity. The upper steering bearing, also known as an upper bearing cup, is threadably engaged thereon. Above the upper bearing cup there is a lock washer disposed about the steering tube. The lock washer is immobilized from rotation relative to the steering tube, typically by means of a radially inwardly extending key that extends into a longitudinal keyway defined on the outer surface of the upper, threaded extremity of the steering tube. Above the lock washer there is an annular, internally threaded lock nut which is threadably engaged with and advanced onto the outer, externally threaded upper extremity of the steering tube, and which can be tightened downwardly. Thus, the steering tube is maintained coaxially within the frame head tube. The steering tube is able to rotate freely within the frame head tube on the upper and lower bearing cups, but cannot move longitudinally relative thereto.

The external threads on the steering tube allow the lock nut to be engaged on the upper threaded extremity of the steering tube and tightened down to exert a preloading force between the steering tube and the head tube. That is, by advancing the lock nut onto the steering tube toward the front wheel fork, a force is exerted that tends to pull the steering tube upwardly relative to the head tube, thereby taking out any longitudinal play between the steering tube and the head tube. The steering tube and head tube can still rotate relative to each other since a set of upper and lower steering bearings are interposed between the steering tube and the head tube.

In order for a rider to steer the bicycle, it is necessary for the bicycle handlebars to be firmly secured to the steering tube. This connection is normally established using a stem, one end of which is connected to the handlebars and the other end of which terminates in a quill. The steering tube is a cylindrical, annular structure and thus is completely hollow. The quill extends down into the hollow, upper extremity of the externally threaded steering tube.

A handlebar stem quill of a conventional bicycle includes a quill body, which is a hollow, cylindrical annular structure of uniform cross section that extends down into the steering tube. An arm of the stem extends laterally outwardly away from the quill body and is rigidly joined thereto. The remote end of the stem terminates in a clamp which may be secured to the handlebars of a bicycle.

The quill body must also be secured to the steering tube. The clamping mechanism typically employed for this purpose is a quill locking nut that is internally threaded to receive a bolt that passes longitudinally through and beyond the length of the quill body. The locking member has an upwardly facing surface that is inclined at an angle of about 45 degrees relative to the axis of the bolt. The lower extremity of the quill body likewise terminates in an annular face oriented at an angle of 45 degrees relative to the longitudinal alignment of the quill body.

When the quill bolt is tightened to draw the locking nut upwardly toward the bolt head, the inclined faces of the quill body and locking nut are forced to shift, or slide laterally relative to each other so as to allow the locking nut to advance longitudinally along the quill bolt toward the bolt head. When this occurs, the quill nut shifts out of axial alignment relative to the quill body, thus causing the quill body and the quill nut to engage the interior cylindrical surface of the steering tube with a strong, frictional force. The apex of the quill locking nut is in effect wedged in between the quill body, often called the stem shaft, and the interior wall of the steering tube. This conventional clamping arrangement is advantageous in that the length of the stem shaft which protrudes above the locking nut and the frame head tube is thereby adjustable to suit the height and comfort of the rider.

In a bicycle lacking a rotatable brake cable coupling system for the rear brake cables, the front brake cable is merely routed from the front brake control mounted on one of the handlebars down alongside and outside of the head tube and is connected to the front brake elements which are secured to the front wheel fork. In order for the bicycle steering assembly to be freely rotated relative to the frame of a bicycle on which a rotatable brake cable coupling system has been installed to accommodate the rear brake cable, however, it is necessary to route the front brake cable in a manner so that the front brake cable does not strike the bicycle frame as the front wheel and handlebars are rotated relative to the frame.

In order to route the front brake cable down through a conventional, externally threaded steering tube, a quill employing a hollow, oversized bolt is substituted for the standard sized quills normally utilized in the construction of bicycles. A matching quill locking nut with an enlarged, internally tapped bore therethrough is also provided. In this arrangement the diameter of the shank of the quill bolt and the size of the quill bolt head are enlarged and the center of the quill bolt is longitudinally bored to provide a passageway therethrough. This passageway accommodates the passage of both the sheath and core of the front brake cable.

By utilizing such an oversized, hollow bolt it is possible to route the front brake cable from the front brake control on the handlebar down through the hollow, axial center of the quill bolt, which resides within the confines of the threaded steering tube. The entire cable thereupon emerges from the bottom of the hollow steering tube proximate the connection thereto of the steering fork. The operating end of the front brake cable is coupled to the front brake calipers in a conventional manner.

When a bicycle with a threaded steering tube is equipped with a rotatable brake cable coupling system for the rear brake and a quill with a hollow, oversized quill bolt, the front wheel, front wheel fork, steering tube, stem and handlebars of the bicycle can be rotated as a unit relative to the bicycle frame and head tube through multiple rotations relative thereto. Neither the front brake cable nor the rear brake cable will strike the frame of the bicycle during the rotation of the steering assembly relative to the frame.

In recent years a different, threadless type of steering tube has gained increased popularity. The threadless steering tube was introduced to the marketplace for several reasons. One reason was to attempt to eliminate wobble of the steering tube relative to the frame head tube that sometimes occurs in threaded systems. Such wobbling results when the bicycle is subjected to such heavy impacts that the lock washer damages the threads on a threaded tube. When this occurs a certain amount of vertical play results between the steering tube and the frame head tube. This can cause wobbling of the front wheel assembly of the bicycle relative to the frame.

Another object of a threadless steering tube was to reduce assembly time by eliminating the requirement for threading and tightening the lock nut onto the threads of the steering tube during assembly of the bicycle. Another purpose in devising a threadless steering tube was to create a single standard length of steering tube as measured from the top of the fork race to the top of the steering tube. At present, threaded steering tubes come in standard lengths of 140, 170, 200 and 230 millimeters. Another object of a threadless steering tube was to attempt to reduce the weight of the steering tube assembly.

A threadless steering tube does not utilize a quill for attaching the handlebar stem to the steering tube. Rather, a clamping sleeve is employed instead. One advantage of utilizing a steering stem having a clamping sleeve rather than a quill is that an increase in leverage of the handlebars is achieved relative to that obtainable with a threaded steering tube system. That is, in a conventional threaded steering tube system in which a quill is secured by friction within the hollow steering tube, the leverage of the turning force applied through the handlebars to the stem shaft acts with a lever arm equal to the radius from the steering tube axis to the interface between the quill and the surrounding externally threaded steering tube. The moment arm of torsional forces is thereby equal to the inside diameter of the steering tube.

In contrast, by employing a stem with a clamping sleeve, the torsional force applied through the handlebars to the steering stem shaft is transmitted to the steering tube at the interface between the clamping sleeve and the exterior surface of the threadless steering tube. That is, the lever arm of force transmission through a stem with a coupling sleeve is equal to the outside radius of the steering tube, rather than the inside radius.

In threadless steering tube systems there are no external threads at the top of the steering tubes. Unlike threaded steering tubes, the threadless steering tubes do not employ a handlebar stem with a quill that fits down into the steering tube. Rather a stem is utilized that terminates in an annular, hollow, longitudinally split clamping sleeve. The clamping sleeve is comprised of lugs that embrace a steering tube opening and which are separated from each other by a narrow gap. These radially projecting lugs have generally tangentially directed openings therethrough to receive one or more stem bolts.

The clamping sleeve fits about the exterior surface of the unthreaded upper extremity of the threadless steering tube that projects upwardly above the head tube. The stem bolts span the gap between the stem lugs. When tightened, the stem bolts force the lugs toward each other to thereby frictionally lock the stem sleeve to the steering tube. Frictional locking force is applied to the external convex outer cylindrical surface of the steering tube, rather than to the concave inner cylindrical surface of the steering tube as in threaded steering tube systems that employ locking quills.

In a threadless steering tube system the top of the steering tube is capped with a device known in the industry as a threadless headset. One commercially available type of threadless headset is sold as the "AheadSet System" by Dia-Compe USA, located at 355 Cane Creek Road, Fletcher, N.C., 28732. A threadless headset includes upper and lower annular bearing races interposed between the head tube and the steering tube.

To prevent longitudinal movement between the head tube and the steering tube, a preloading force is exerted to press the front wheel fork longitudinally toward the head tube. This preloading force is applied using a preloading assembly employing a removable cap having an annular flange extending radially out over the top of the steering tube and out over the upper edge of the clamping sleeve of the stem. A central, annular portion of the cap fits down into the top of the steering sleeve. A flanged, internally threaded barrel having a plurality of radially projecting and upwardly inclined flanges thereon is secured by a draw bolt to the cap. This flanged barrel is referred to in the trade as a star fangled nut. With the draw bolt loosely engaged in the flanged barrel, the central annular portion of the cap and flanged barrel are inserted down inside of the steering tube, where the flanges on the barrel project radially outwardly to contact the concave interior wall surface of the steering tube. When the draw bolt is tightened, the flanges are spread even further radially outwardly and exert outwardly directed radial forces against the interior surface of the steering tube near the upper extremity thereof.

Due to the manner of construction of a threadless headset, it is not possible for an oversized draw bolt to be employed in a preloading assembly used with a conventional threadless headset, since the diameter of the internally threaded barrel bearing the radially projecting flanges could only be enlarged by shortening the length of the radially projecting flanges. This would vastly reduce the frictional gripping force applied by the flanges, and thus destroy their effectiveness. Furthermore, the diameter of the draw bolt of a preloading assembly utilized with a conventional threadless headset is too small to allow passage of the outer sheath of the front brake cable if one were to bore out the center of the preloading assembly draw bolt along its axis in the same manner in which hollow, oversized quill bolts are fabricated to accommodate the passage of the front brake cable. As a consequence, it has heretofore not been possible to mount a steering assembly employing a threadless steering tube and a threadless headset in such a way that the front wheel steering assembly can be rotated freely relative to the head tube and bicycle frame in a bicycle having a front hand brake.

SUMMARY OF THE INVENTION

A primary object of the present invention is to provide a system that permits the front wheel steering assembly of a bicycle having front and rear hand brakes and employing a threadless steering tube and preloading assembly to be mounted on a bicycle frame in such a manner that the front wheel steering assembly is freely rotatable relative to the bicycle head tube and bicycle frame. This object is achieved by providing the bicycle with a rotatable brake cable coupling system for the rear brake and with a modified construction of the preloading assembly that is employed with an otherwise conventional threadless headset. The improved structure is both a preloading and cable routing assembly that enables at least the core of the front brake cable to be routed longitudinally down through the hollow, threadless steering tube to the front brake.

Another object of the invention is to provide the rider of a bicycle having front and rear hand brakes and a threadless steering tube and threadless headset with the ability to also have a front wheel steering assembly for the bicycle that is completely rotatable relative to the bicycle head tube and frame. For the first time threadless steering tubes employing threadless headsets can be utilized on free-style bicycles having front and rear hand brakes.

Another object of the invention is to provide a means for adapting a threadless steering tube and threadless headset for use in a bicycle having both front and rear hand brakes. This allows the rider to enjoy not only the advantages of a threadless steering tube and threadless headset, but also the ability to completely rotate the steering assembly as a unit freely relative to the bicycle frame without any obstruction from either hand brake cable.

In one broad aspect the present invention may be considered to be an improvement in a bicycle having a hollow, cylindrical, annular bicycle frame head tube, a front wheel fork, a hollow threadless steering tube secured atop the front wheel fork and projecting upwardly through the head tube and protruding through the top of the head tube, head tube bearings interposed between the head tube and the steering tube, a handlebar stem, a set of handlebars carried by the handlebar stem, and a preloading assembly secured to the threadless steering tube and exerting a longitudinal, downward force on the handlebar stem toward the front wheel fork. Such a bicycle also employs front and rear brake controls mounted on the handlebar set, front and rear wheel brakes, and front and rear brake cables leading respectively from the front and rear brake controls to the front and rear wheel brakes.

The improvement of the invention is comprised of a brake cable coupling system which divides the rear brake cable into a control portion that is secured to the handlebar set and to the steering tube and an operating portion that is secured to the rear wheel brake and to the head tube. The brake cable coupling system includes a rotatable means connected to the rear brake cable control portion and secured to the steering tube and nonrotatable means connected to the rear brake cable operating portion and secured to the head tube. The rotatable means is connected to the nonrotatable means through an annular bearing mechanism disposed concentrically about and externally of the head tube and the steering tube. The improvement is further characterized in that the preloading assembly has a longitudinal passageway therethrough so as to serve also as a cable routing assembly. The front brake cable passes longitudinally through the steering tube and through the longitudinal passage in the preloading and cable routing assembly, which exerts a longitudinal preloading force on the head tube bearings.

The front brake cable is comprised of a tubular, plastic sheath surrounding an inextensible metal core. The core is movable longitudinally within the sheath and is attached to the front brake control and to the front wheel brake at its opposite ends. Like a conventional preloading assembly for a conventional threadless headset, the preloading and cable routing assembly of the invention includes a cap having a radial flange that bears longitudinally against the handlebar stem and which has a longitudinal opening therethrough. The preloading and cable routing assembly of the invention includes an annular, wedging assembly disposed within the steering tube and engaged with the cap, whereby advancement of the wedging assembly toward the cap causes the preloading assembly to exert a radially outwardly directed force on the interior of the steering tube to thereby frictionally grip the steering tube and immobilize the preloading assembly relative thereto.

Unlike a conventional preloading assembly, the preloading and cable routing assembly of the invention is constructed in such a manner as to allow the front brake cable to pass through a longitudinal opening in the cap and longitudinally through the annular wedging assembly. This is possible in one embodiment of the invention by forming the cap as an internally threaded cap nut and the wedging assembly with an annular inner rigid draw pin. In this embodiment the longitudinal passageway through the preloading assembly is formed along the axial center of the draw pin and is defined by the interior wall surface thereof. The upper end of the draw pin is externally threaded and threadably engaged with the cap nut. The lower end of the draw pin has a frusto-conical outer surface. The wedging assembly also includes a resilient, annular expansion plug, the upper end of which resides in a transverse orientation relative to the steering tube axis inwardly beneath the cap nut in longitudinal bearing relationship relative thereto. The expansion plug also has a lower end which forms a skirt disposed radially about the lower end of the draw pin.

The draw pin in the preloading and cable routing assembly of the invention is large enough in cross section so that the central, axial passageway therethrough is of a large enough diameter to accommodate a conventional brake cable sheath, which is typically about three-sixteenths of an inch in diameter. This modified preloading assembly does not rely upon outwardly deployed spring flanges to grip the interior wall of the steering tube. To the contrary, this function is performed by the wedging action of the frusto-conical lower portion of the rigid draw pin into the resilient skirt that is disposed radially thereabout. As a consequence, the wedging apparatus can be formed with a considerably larger diameter, longitudinal passageway therethrough as contrasted with the internal diameter of a conventional star fangled nut employed in a conventional preloading assembly for a threadless headset system. Thus, the longitudinal passageway in the wedging system of the invention is of a diameter sufficiently large to receive and accommodate the outer sheath of the front brake cable.

Preferably, an annular thrust washer is disposed between the upper end of the expansion plug and the cap nut. This allows the cap nut to be rotated without excessive friction against the expansion plug so as to pull the draw pin upwardly toward the cap nut and thereby radially press the skirt of the expansion plug outwardly against the interior wall of the threadless steering tube in tight frictional engagement therewith.

In an alternative embodiment of the invention a means has been found for modifying the existing type of preloading assembly for a threadless headset so as to allow at least the inextensible core of the front brake cable to pass longitudinally through the threadless steering tube. According to this arrangement the steering tube is provided with a lower end plug having a longitudinal opening defined therethrough. The lower end plug is disposed in the steering tube adjacent the front wheel fork.

Also, the front brake cable is comprised of a flexible, tubular sheath divided into upper and lower segments surrounding an inextensible core that is movable longitudinally within the sheath. The upper sheath segment is secured to the front brake control and to the preloading and cable routing assembly. The lower sheath segment is secured to the steering tube lower end plug and to the front wheel brake. The inextensible core is coupled at its opposite ends to the front brake control and to the front wheel brake and extends through both the upper and lower sheath segments. This allows the front wheel brake control to operate the front wheel brake by moving longitudinally within the sheath segments and within the longitudinal openings in the preloading and cable routing assembly and the steering tube lower end plug. It is important for both ends of both sheath segments to be longitudinally immobilized relative to the structures to which they are secured so that the path distance for the core between the front brake control and the front wheel brake is constant and unchanging.

The upper sheath segment terminates at the top of the preloading and cable routing assembly and is secured thereto. The otherwise conventional draw bolt of the preloading and cable routing assembly is bored longitudinally along its axis at a diameter sufficient to accommodate passage of the inextensible cable core, even though this opening is too narrow to allow the sheath surrounding the core to pass therethrough. Similarly, the lower sheath segment terminates at and is secured to the lower end plug about the longitudinal opening defined therethrough. Again, the opening in the lower end plug is large enough to permit the front brake cable core to move reciprocally therethrough, even though it is not large enough to permit passage of the lower sheath segment. This embodiment has the advantage of allowing use of the components of an existing preloading assembly with the only modification thereto being the longitudinal boring out of a passageway along the axis of the draw bolt.

The invention may be described with greater clarity and particularity by reference to the accompanying drawings.

9

Figure 2:
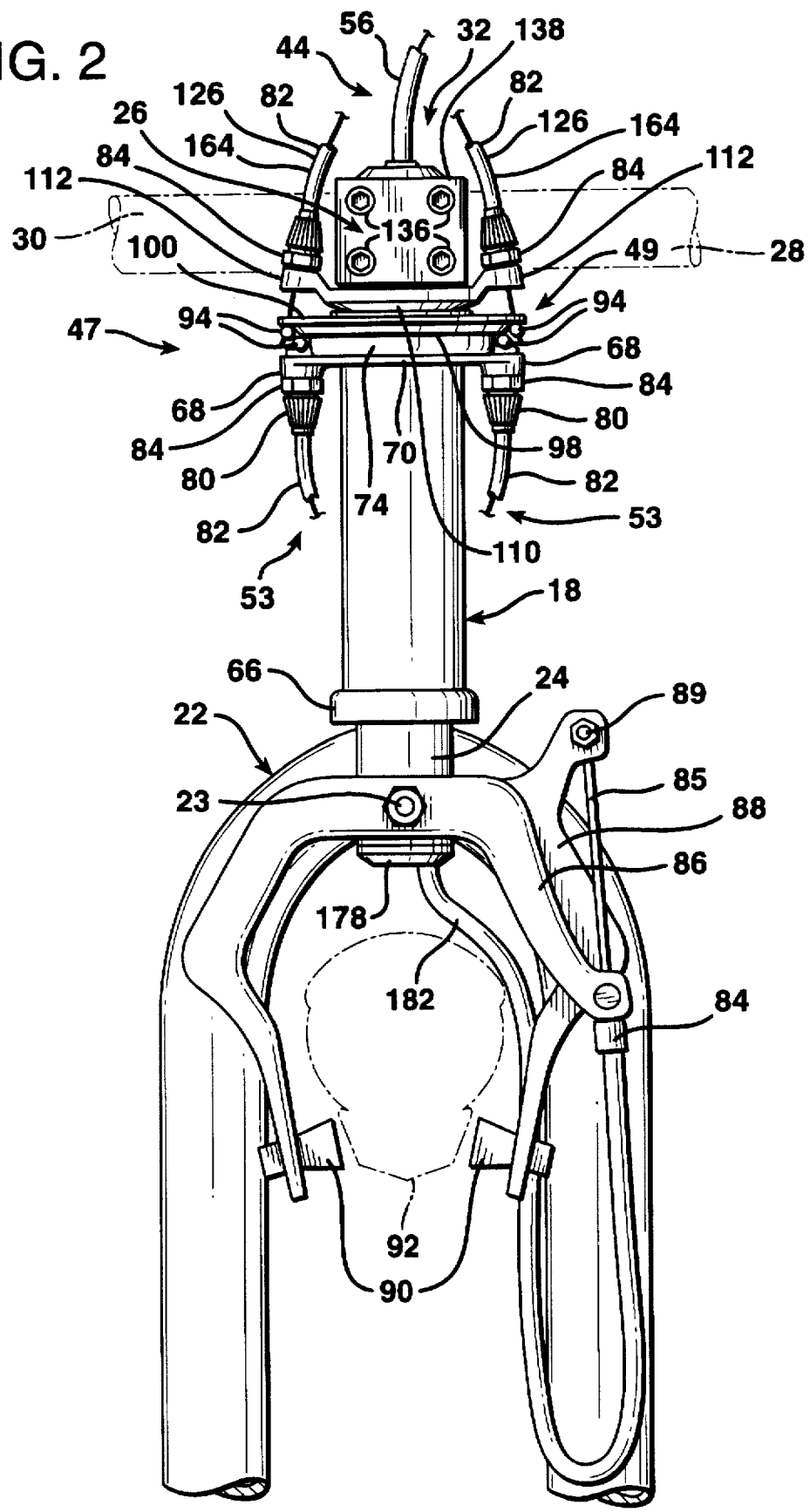
FIG. 2 is a front elevational view of a portion of the bicycle of FIG. 1 illustrating certain features of one embodiment of the invention.
Figure 4:
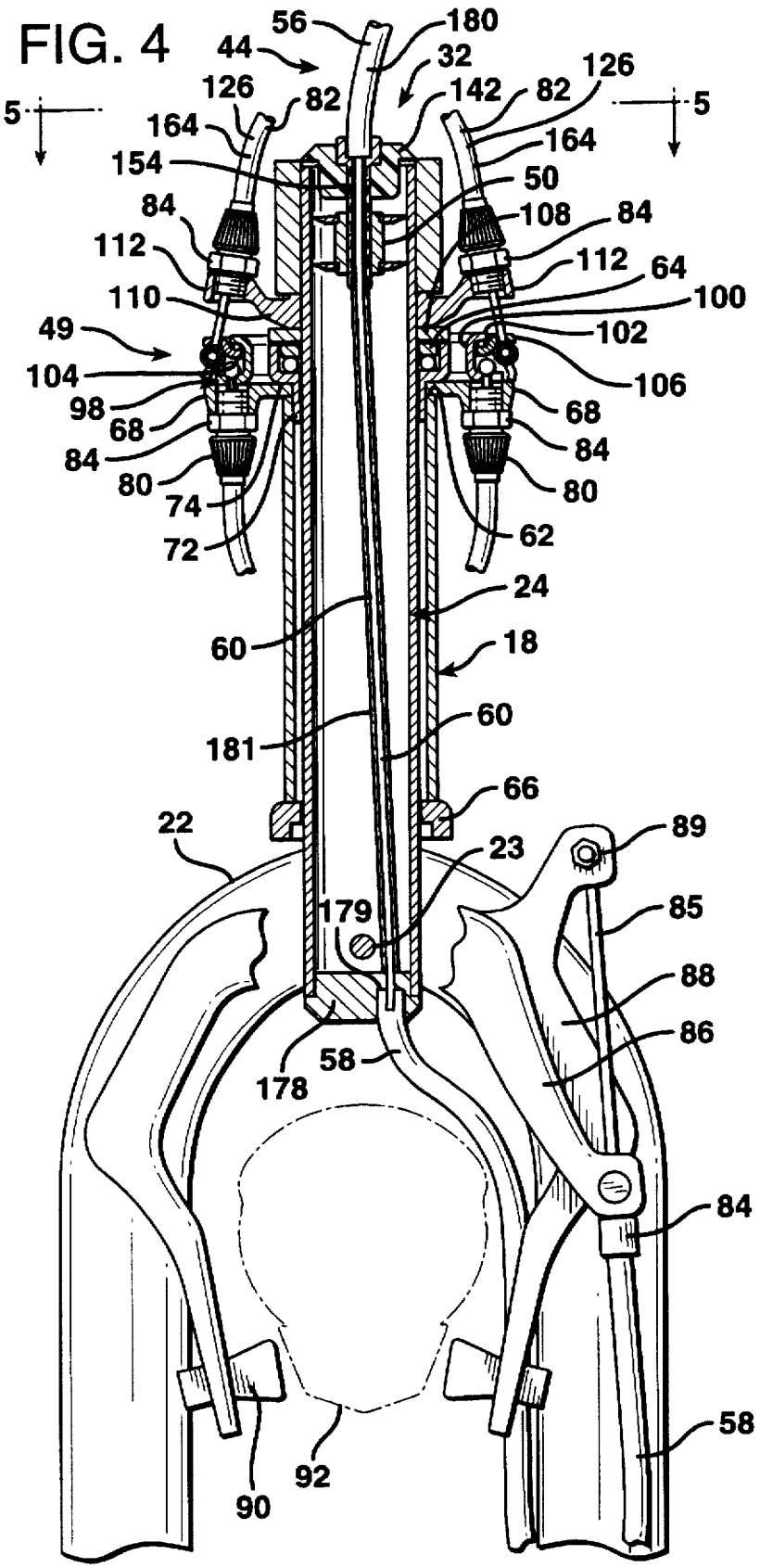

FIG. 4 is a sectional elevational view of the portion of the bicycle shown in FIG. 2.

Figure 5:
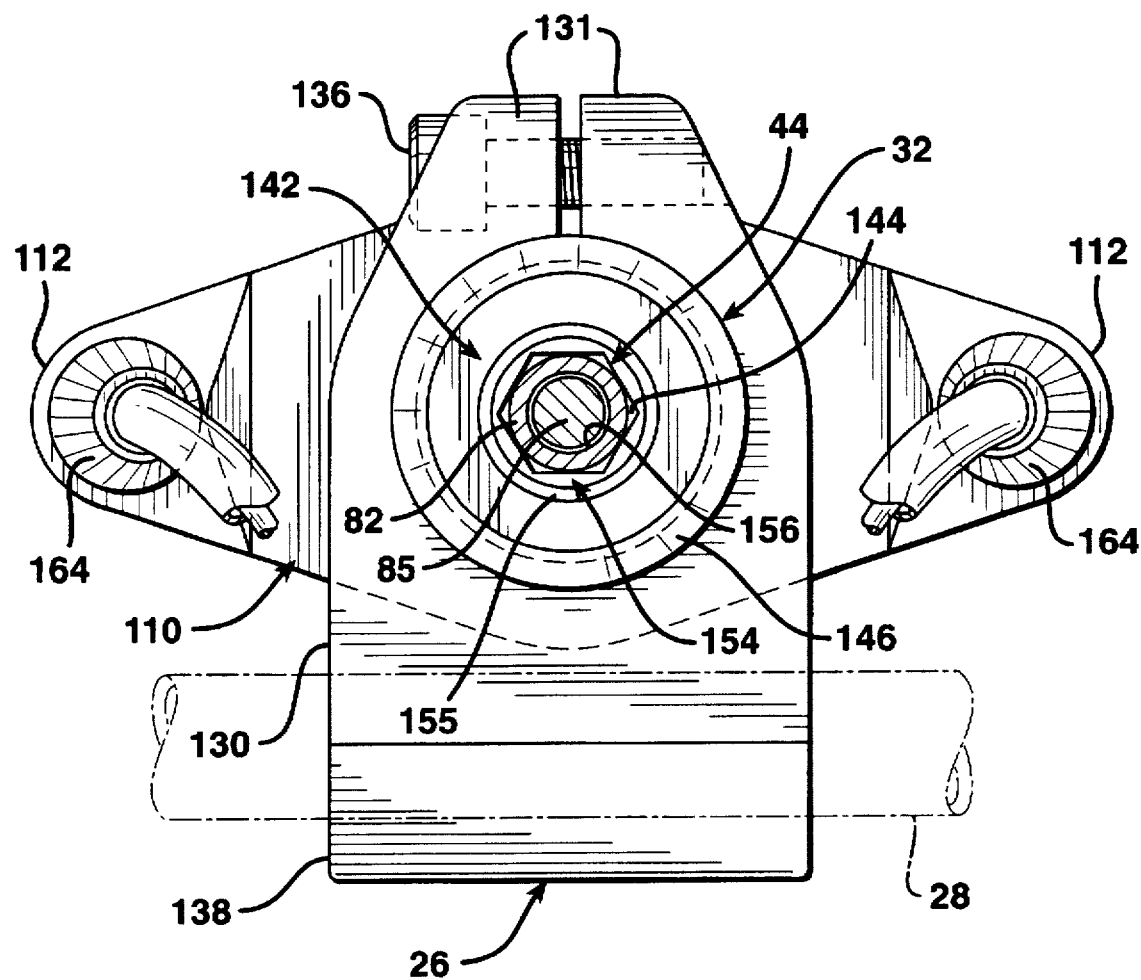

FIG. 5 is a top plan detail taken along the lines 55 of FIG. 4.

Figure 6:
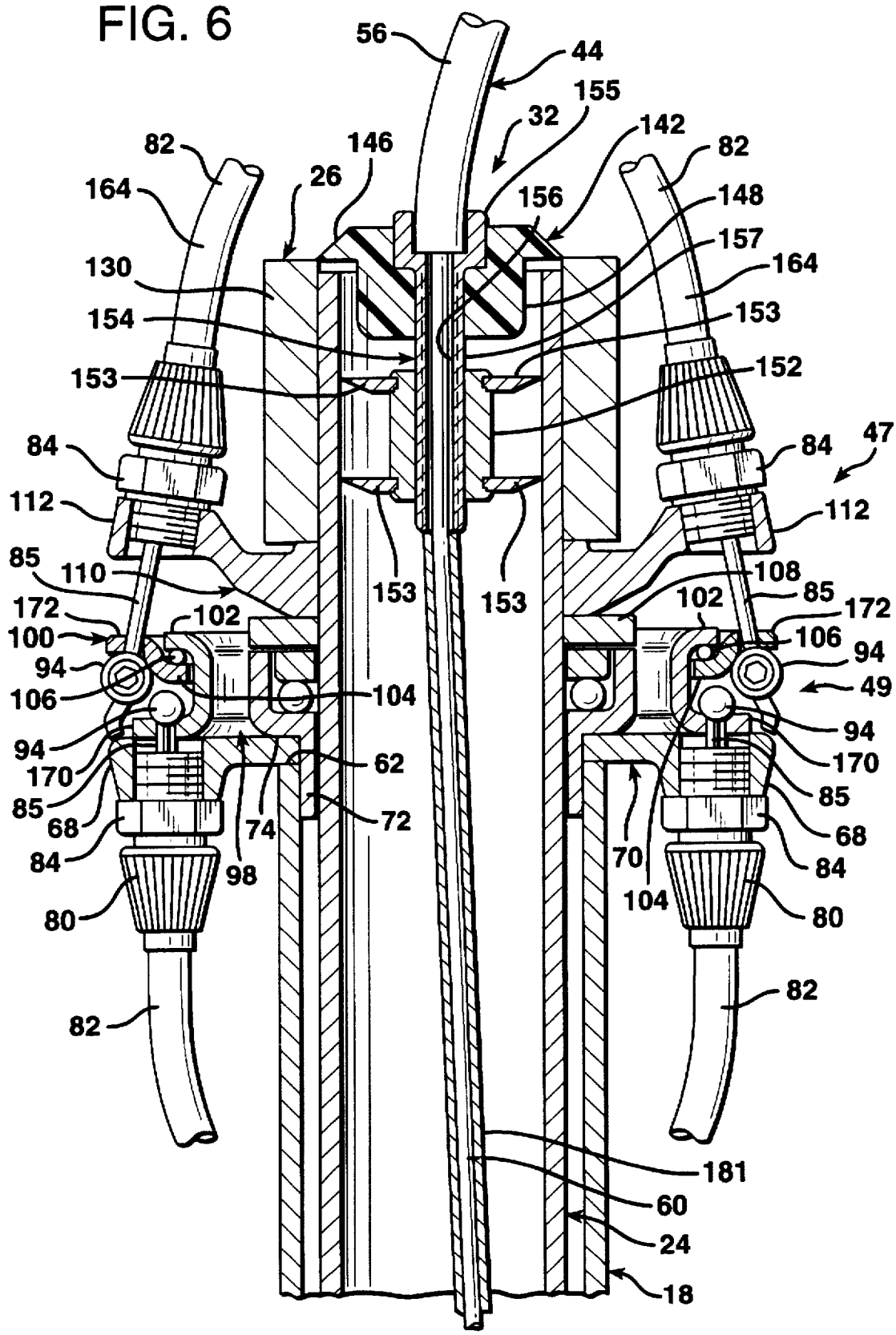

FIG. 6 is a sectional elevational detail of the preloading and cable routing assembly, upper portion of the threadless steering tube, and rotatable brake cable coupling system shown in FIG. 4.

Figure 7:
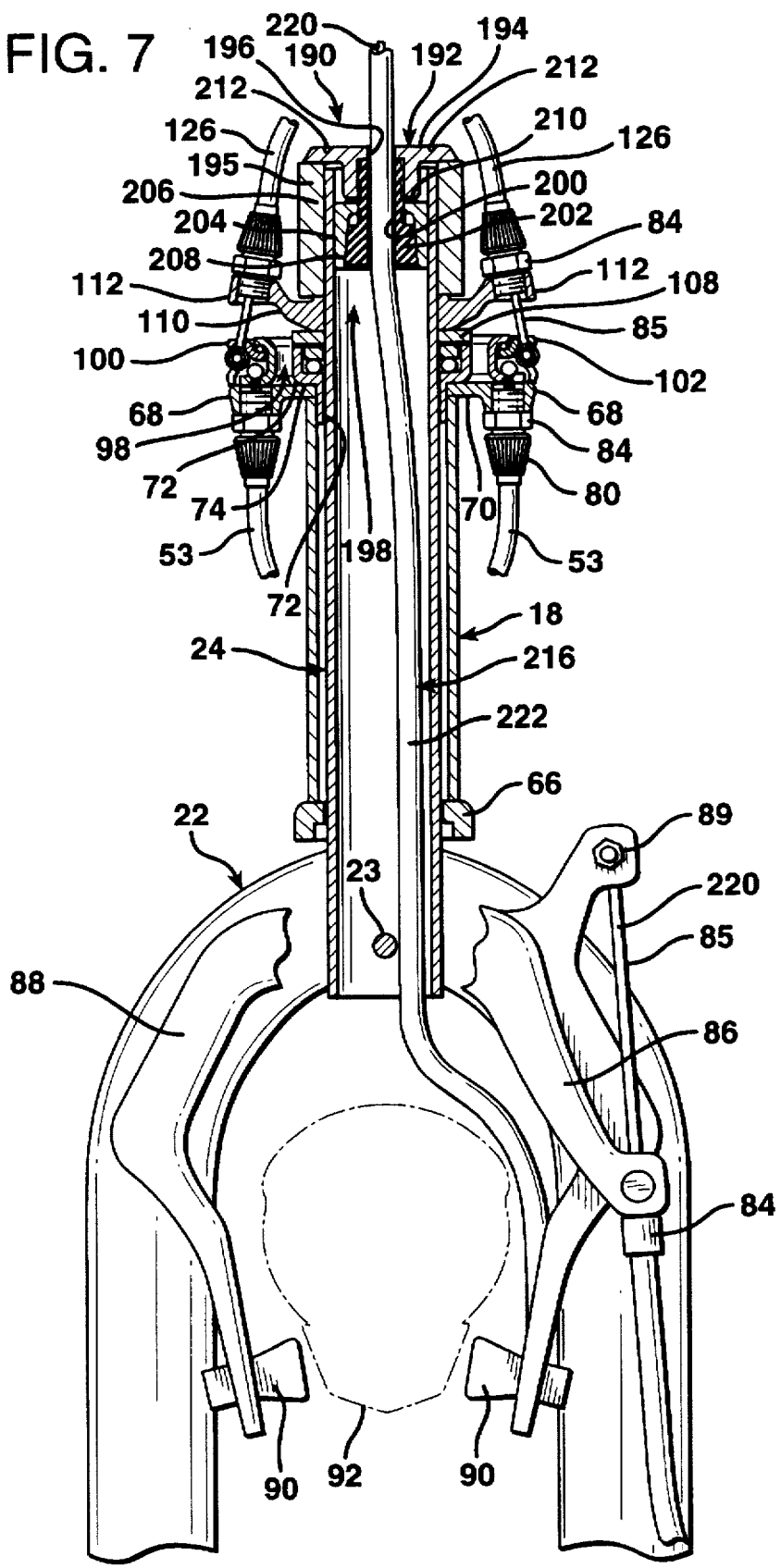

FIG. 7 is a sectional elevational view illustrating an alternative embodiment of the invention to that shown in FIG. 4.

Figure 8:
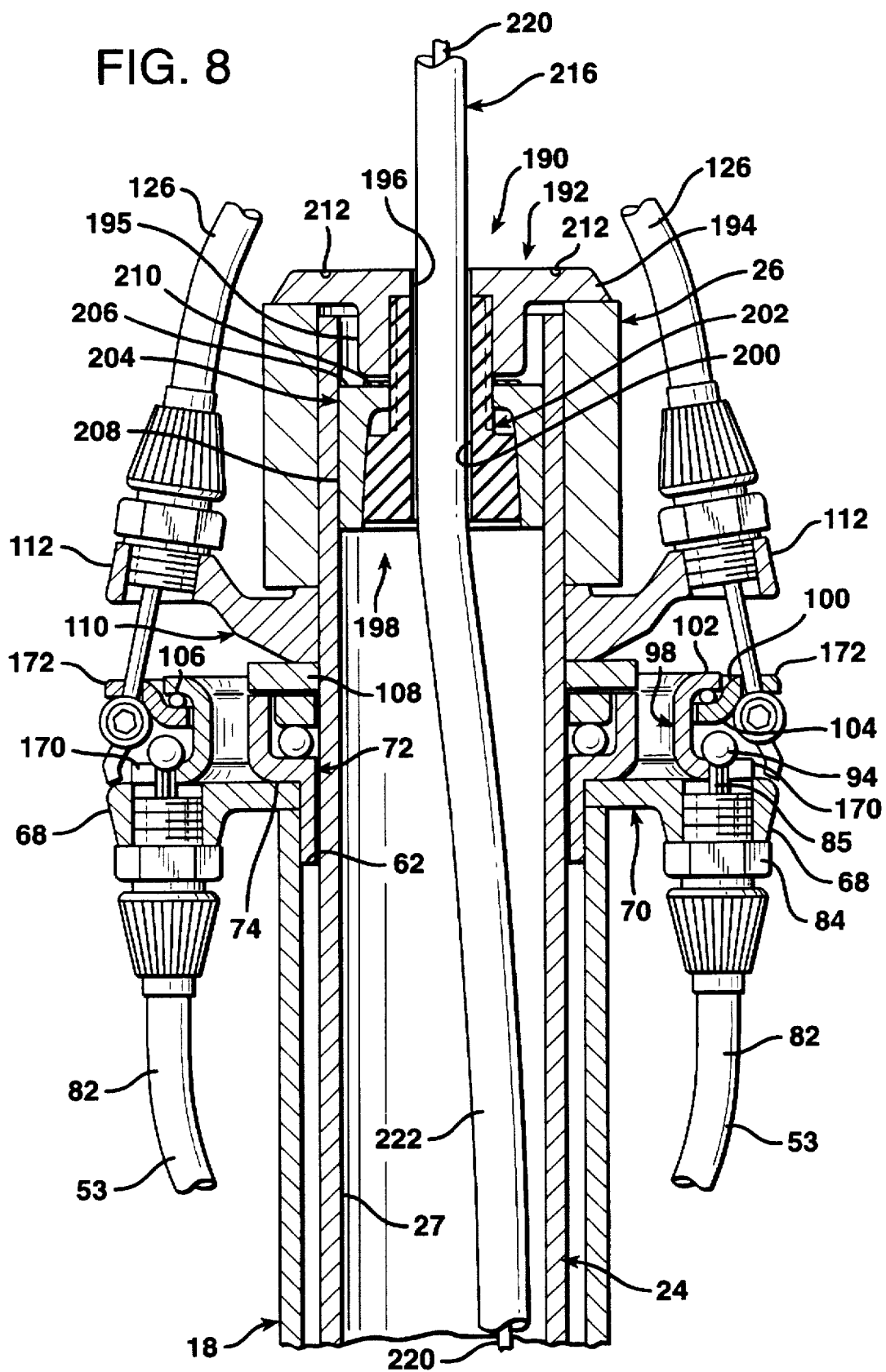

FIG. 8 is a sectional elevational detail of an alternative embodiment to that shown in FIG. 7 of a preloading and cable routing assembly, upper portion of the threadless steering tube, and rotatable brake cable coupling system.

DESCRIPTION OF THE EMBODIMENTS

Figure 1:
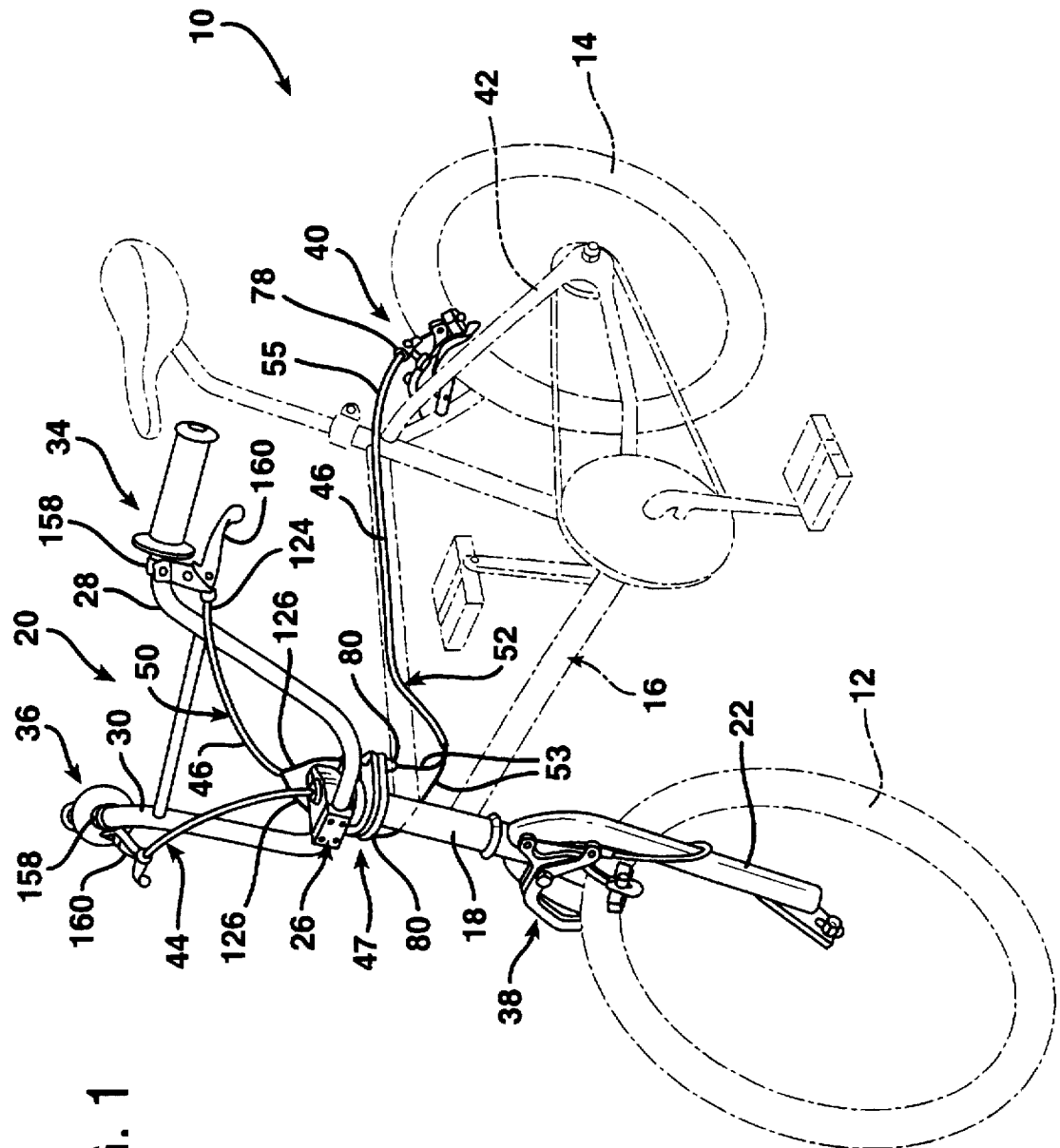
FIG. 1 is perspective view of a bicycle constructed according to the improvement of the invention.

FIG. 1 illustrates a bicycle 10 having the usual front wheel 12 and real wheel 14 which support a tubular steel or aluminum frame 16. The frame 16 is equipped with a hollow, cylindrical, annular bicycle frame head tube 18.

The bicycle 10, like all bicycles, includes a front wheel steering assembly indicated generally at 20. The front wheel steering assembly 20 includes the front wheel 12, a front wheel fork 22, a threadless steering tube 24, visible in FIGS. 3–8, a handlebar stem 26, and a set of handlebars 28 and 30. The threadless steering tube 24 is located atop the front wheel fork 22 and projects upwardly through the head tube 18 of the frame 16.

The threadless steering tube 24 is secured to the front wheel fork 22 by a weldment. A transverse hole is drilled through the steering tube 24 to accommodate a transverse steel pin 23 upon which the brake calipers 86 and 88 of the front wheel brake 38 are mounted. The threadless steering tube 24 extends through an opening in the upper extremity of the front wheel fork 22 upwardly from the upper extremity of the front wheel fork 22, as illustrated in FIG. 2. The threadless steering tube 24 is a cylindrical, annular, hollow structure and has a smooth, convex, cylindrical, outer surface 25 and a smooth, concave cylindrical inner surface 27 that extend longitudinally throughout its length.

As shown in FIG. 4, the upper portion of the threadless steering tube 24 protrudes above the top edge 62 at the upper end of the head tube 18. An upper steering bearing 64, sometimes called an upper steering bearing cup, and a lower steering bearing 66, sometimes called a lower steering bearing cup, are respectively interposed between the steering tube 24 and the head tube 18 at the upper and lower ends of the head tube 18. The bearings 64 and 66 are the operative components of a threadless headset. The steering tube 24 is fully and smoothly rotatable on the steering bearings 64 and 66 relative to the head tube 18 at the upper and lower ends thereof.

The portion of the steering tube 24 that protrudes above the head tube 18 is captured within the grip of the stem 26. The stem 26 also carries the handle bars 28 and 30. A preloading and cable routing assembly, indicated generally at 32 in FIG. 4, is secured to the top of the threadless steering tube 24 and exerts a longitudinally downward force on the handlebar stem 26 toward the front wheel fork 22. The preloading and cable routing assembly 32 is secured to the steering tube 24 at the upper extremity of the inner surface 27 thereof.

A rear brake control 34 and a front brake control 36 are respectively mounted on the handlebars 28 and 30 in the handlebar set. The bicycle 10 also includes a front wheel brake 38 and a rear wheel brake 40. The front wheel brake 38 is mounted on the front wheel fork 22, while the rear wheel brake 40 is mounted on the rear wheel fork 42. A front brake cable 44 and a rear brake cable 46 lead respectively from the front and rear brake controls 36 and 34 to the front and rear wheel brakes 38 and 40.

The front wheel brake 38 and the rear wheel brake 40 are identical to each other both functionally and structurally, and are best illustrated in FIGS. 2, 4, and 7. Each of the brakes 38 and 40 is comprised of a pair of brake calipers 86 and 88. The brake calipers 86 and 88 employ brake pads 90 which, when the brakes are actuated, bear against the bicycle wheel rims 92 of the front and rear bicycle wheels 12 and 14, respectively. When the brake is released a wire spring (not shown) biases the brake calipers 86 and 88 such that the brake pads 90 are drawn out of contact with the wheel rims 92. The brakes 38 and 40 are conventional structures such as those sold, for example, as the ODYSSEY SYSTEM 2000 brakes by Bear Corporation located at 17101 So. Central Avenue, No. G, Carson, Calif. 90746.

The rear brake operating control 34 is mounted on the handlebar 28. The rear brake operating control 34 is a conventional bicycle hand brake control which includes a rear brake control stationary member 158 that is secured to the handlebar 28 and a rear brake control engagement lever 160 that is mounted for rotational movement relative to the rear brake control stationary member 158.

According to the improvement of the invention, a rotatable brake cable coupling system 47 is mounted on the head tube 18. The rotatable brake cable coupling system 47 includes a rotor assembly 49 that divides the rear brake cable 46 into a control segment 50 that is secured to the rear brake control 34 and to the threadless steering tube 24 and an operating segment 52 that is secured to the head tube 18 and to the rear wheel brake 40.

As best illustrated in FIGS. 4 and 6, in one embodiment the front brake cable 44 includes an upper, plastic, tubular sheath section 56 and a lower, plastic, tubular sheath section 58 that are disposed coaxially about a brake cable core 60 formed of an inextensible material, such as a plurality of twisted stainless steel wires. At least the core 60 of the front brake cable 44 is routed through a longitudinal passageway formed through the preloading and cable routing assembly 32, through the hollow, threadless steering tube 24 and extends from the front brake control 36 to the front wheel brake 38.

With the routing of the front brake cable 44 and the provision of a rotatable brake cable coupling system 47, the steering assembly 20, the rear brake cable control segment 50, and the front brake cable 44 are freely rotatable together relative to the head tube 18 and relative to the rear brake cable operating segment 52.

Figure 3:
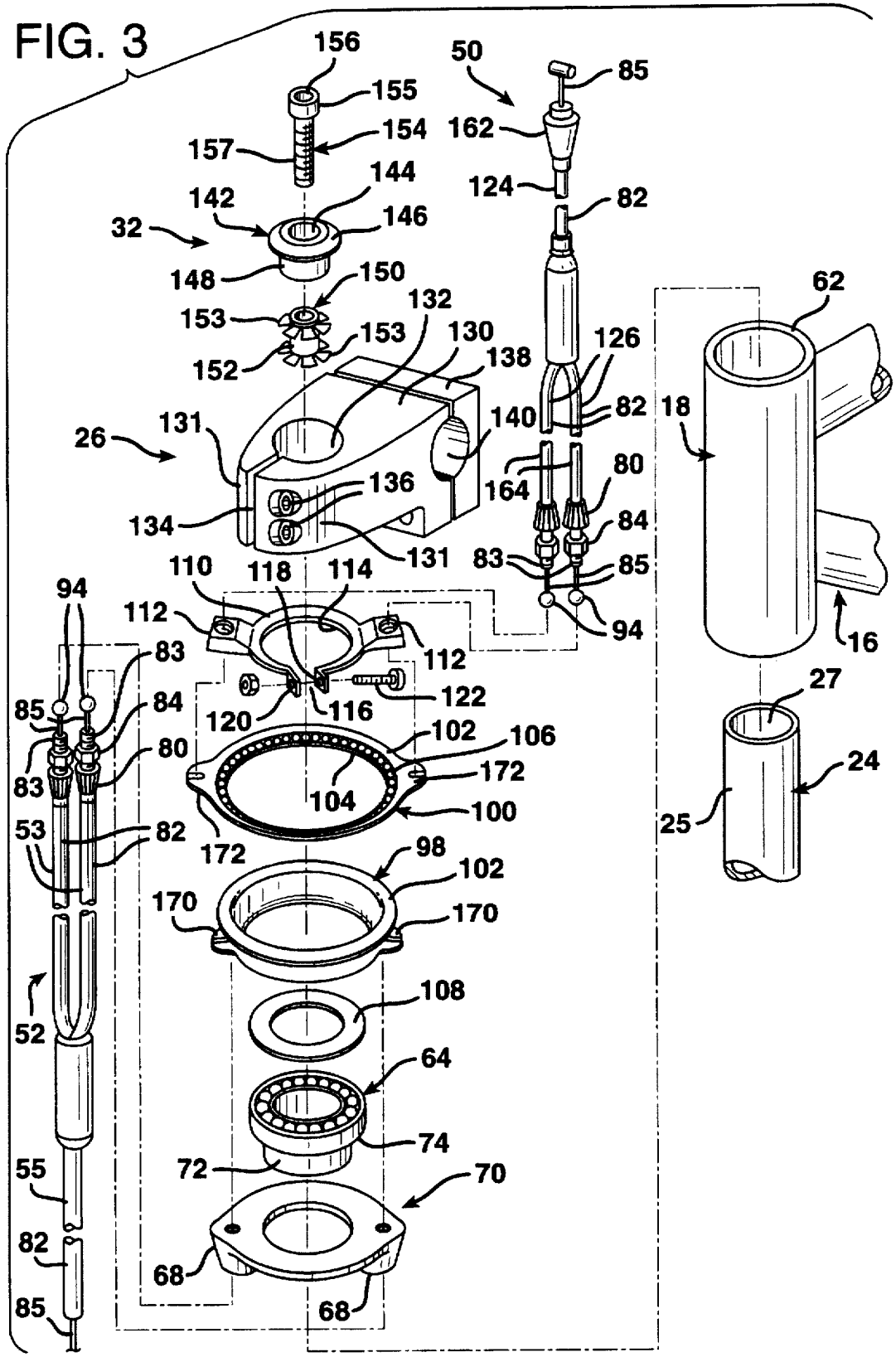
FIG. 3 is an exploded perspective view illustrating certain important features of the embodiment of the invention shown in FIG. 2, as viewed from the position of the rider.

As shown in FIGS. 3, 4, and 5, a pair of diametrically opposed, lower, nonrotatable brake cable termination ears 68 project radially outwardly from a lower cable stop plate 70 that resides in abutment against the upper edge 62 of the head tube 18. The ears 68 that project outwardly from the lower cable stop plate 70 have longitudinal, internally threaded openings defined therethrough.

The lower cable stop plate 70 is held immobilized relative to the head tube 18 by the lower bearing race of the upper steering cup 64. As best shown in FIG. 6 the lower bearing race of the upper steering cup 64 forms a sleeve 72 that extends down along the inner wall of the head tube 18 and is pressed in an interference fit therewith. That is, the sleeve 72 presses radially outwardly in a tight friction fit against the inner wall of the head tube 18. The shoulder 74 of the upper steering bearing cup 64 projects radially outwardly beyond the diameter of the head tube 18. When the sleeve 72 of the upper headset cup 64 is press fit down into the head tube 18, the shoulder 74 bears longitudinally downwardly against the lower cable stop plate 70, clamping it tightly against the upper edge 62 of the head tube 18. This totally immobilizes the lower cable stop plate 70 relative to the head tube 18.

The rear brake operating segment 52 has a pair of coupling segment portions 53 and an operating segment portion 55. Each of the portions 53 and 55 is comprised of a hollow, operating segment sheath element 82 and an inextensible operating segment core element 85. The core elements 85 are each movable longitudinally within their respective sheath elements 82. The operating segment core elements 85 are each formed of twisted stainless steel wires.

Like the lower, operating segment 52 of the rear brake cable 46, the upper control segment 50 thereof is divided into a control segment portion 124 and a pair of operating segment coupling portions 126. Each of the cable portions 124 and 126 is formed of a stiff but bendable plastic sheath element 82 disposed about a central core 85 formed of twisted stainless wires. The cores 85 of the operating coupling portions 126 terminate in coupling end termination knobs 94. The cores 85 of each of the cable portions 124 and 126 are movable in longitudinally reciprocal fashion within their respective sheath elements 82. The upper control segment 50 of the rear brake cable 46 has a single brake control end termination 162 and a pair of operating end coupling terminations 164.

The operating segment 52 of the rear brake cable 46 has a single brake operating end termination 78 and a pair of control coupling end terminations 80. The operating segment sheath elements 82 terminate in threaded nipples 83. Adjusting nuts 84 are threadably engaged externally upon the threaded nipples 83 at the control coupling end terminations 80 of the rear cable operating segment 52.

The externally threaded nipples 83 are threadably engaged in the internally threaded openings in the fixed brake cable termination ears 68 to secure the operating segment sheath elements 82 to the lower fixed brake cable termination ears 68. The extent of advancement of the adjustment nuts 84 along the threaded nipples 83 serves to adjust the effective lengths of the operating segment sheath elements 82 so as to increase or decrease tension on the cable core elements 85 disposed therewithin. The adjustment nuts 84 are advanced or backed off relative to the open ends of the nipples at the operating segment sheath elements 82 to selectively vary the extent to which the nipples can advance into the ears 68. The wires of the core elements 85 are secured to engagement knobs 94 at their control coupling end terminations 80.

The opposite extremity of the core element 85 in the operating segment portion 55 of the single brake operating end 78 of the rear brake cable operating segment 52 is similarly secured to one rear brake caliper 88 in a pair of rear brake calipers 86 and 88 in the rear brake 40. The operating segment core element 85 of the operating segment portion 55 of the rear brake cable 46 is secured by a machine screw and nut 89 at the brake operating end termination 78 to the brake caliper 88 of the rear wheel brake 40. The operating segment sheath element 82 of the operating segment portion 55 of the rear brake cable operating segment 52 is secured at the brake operating end termination 78 to the other brake caliper 86 in the rear wheel brake 40 by means of a threaded nipple. The externally threaded nipple of the adjustment nut 84 of the operating portion 55 is threadably engaged in a tapped bore in the brake caliper 86. The extent of engagement of the threaded nipple is limited by an adjustment nut 84, in the manner previously described. The operation of the brake calipers 86 and 88, and the connection of the front and rear brake cables 44 and 46 thereto, is conventional and identical, and is best illustrated in FIGS. 2, 4, and 7.

In addition to the lower cable stop plate 70 bearing the ears 68, the rotatable brake cable coupling system 47 is also comprised of a rotor assembly 49. The rotor assembly 49 includes a nonrotatable or rotationally immobilized connection collar 98 and a collar 100 that is rotatable relative to the nonrotatable collar 98. The nonrotatable collar 98 is formed as an annular structure that extends from beneath the rotatable collar 100 upwardly through a central axial opening therein to form an upper rotor bearing race 102. The upper rotor bearing race 102 is turned radially outwardly at its upper extremity to overhang the inner portion of the structure of the rotatable collar 100 that forms a corresponding lower rotor bearing race 104. The lower rotor bearing race 104 is a rotatable bearing race and is disposed beneath the upper, nonrotatable bearing race 102.

The lower, rotatable bearing race 104 is formed from the structure of the collar 100 which also defines a pair of radially outwardly directed tabs that form top hooks 172. A ring of ball bearings 106 is interposed between the bearing races 102 and 104 so as to allow the collar 100 to turn freely and smoothly on the bearings 106 in rotation relative to the nonrotatable collar 98.

The rotor assembly 49 is disposed coaxially about the head tube 18. The nonrotatable collar 98 forms an upper rotor bearing race 102 which is a nonrotatable bearing race ring. The structure of the nonrotatable collar 98 adjacent the nonrotatable bearing race 102 forms an annular sleeve that extends downwardly. The sleeve is turned outwardly to form a pair of diametrically opposed bottom hooks 170 that depend from the upper, nonrotatable bearing race ring 102. The bottom hooks 170 extend radially outwardly above the level of the head tube 18.

Above the rotor assembly 49 the rotatable brake cable coupling system 47 is provided with an annular thrust washer 108, atop which is mounted an upper cable stop 110 formed as a metal structure having a pair of diametrically opposed, radially projecting upper brake cable termination ears 112. Upwardly facing openings are formed through the upper brake cable termination ears 112. These openings are internally tapped to receive the threaded nipples 83 of cable sheath end terminations therewithin.

The upper cable stop 110 has a central, axial opening 114 therethrough of a diameter only slightly larger than the outer diameter of the threadless steering tube 24. The structure of the upper cable stop 110 is split radially at a location offset ninety degrees from the ears 112 as indicated at 116 in FIG. 3. As shown in that drawing figure, the edges of the upper cable stop 110 adjacent the radial split 116 are bent to form vertically oriented clamping tabs 118 and 120 that face each other.

Openings are defined in the clamping tabs 118 and 120. The opening in the tab 120 is internally threaded so as to engage the shank of a clamping screw 122 that passes through a slightly larger opening in the tab 118. Advancement of the clamping screw 122 draws the clamping tabs 118 and 120 together to thereby close the gap 116 so that the structure of the upper cable stop 110 at the opening 114 therethrough tightly grips the outer surface 25 of the threadless steering tube 24. This ensures that the upper cable stop 110 is clamped to and turns with the steering tube 24. Since upper cable stop 110 is clamped to the steering tube 24, the upper brake cable termination ears 112 are longitudinally immobilized on the steering tube 24 and are rotatable therewith relative to the head tube 18.

In a modification to the system the upper cable stop 110 need not necessarily be radially split. Rather, the system could employ a radial set screw engaged in a longitudinally extending portion of the structure of the upper cable stop 110 so as to bear radially against the outer surface 25 of the threadless steering tube 24. Such a set screw would similarly clamp the upper cable stop 110 against the threadless steering tube 24 to ensure that the upper cable stop 110 is locked to and turns with the threadless steering tube 24.

The control segment sheath element 82 of the control portion 124 of the upper control segment 50 of the rear brake cable 46 is secured at the brake control end termination 162 to the stationary member 158 of the rear brake operating control 34. At the operating end coupling terminations 164, the sheaths 82 of the operating segment coupling portions 126 of the rear brake cable control segment 50 are secured to the upper brake cable termination ears 112. The connections between the sheaths 82 of the cable portions 126 to the upper brake cable termination ears 112 are achieved by means of threaded nipples 83, about which adjusting nuts 84 are threadably engaged, at the operating end coupling terminations 164. The externally threaded nipples 83 at the ends of the cable sheaths 82 are threadably engaged in the internally tapped openings through the ears 112, as limited by the adjustment nuts 84.

The operating segment core elements 85 of the rear brake cable coupling segment portions 53 are secured by their core elements 85 at their control coupling end terminations 80 to the nonrotatable bottom hooks 170. The top hooks 172 project radially outwardly in diametrical opposition from each other, but in longitudinal alignment with the threaded openings in the brake cable termination ears 112. The control segment core elements 85 of the operating segment control portions 126 are secured to the coupling top hooks 172 by means of the knobs 94 at their ends. That is, the knobs 94 are captured in the top hooks 172.

The rear brake 40 operates in the following manner. When the brake lever 160 is pressed toward the stationary member 158 on the handlebar 28, tension is exerted on the core element 85 in the brake cable portion 124. This tension is transmitted to the core elements 85 in the cable portions 126. Since the core elements 85 are inextensible, the tensile force applied thereto by the rear brake lever 160 causes the core elements 85 to retract into the sheaths 82 of the cable portions 126.

Because the sheathes 82 of the these portions are secured to the brake cable termination ears 112, the retraction of the core elements 85 in the cable portions 126 lifts the rotatable collar 100 upwardly, since the knobs 94 of these core elements are engaged beneath the top hooks 172. The lower bearing race 104 is formed as a part of the rotatable collar 100. The upward movement of the lower rotor bearing race 104 carries with it the upper bearing race 102. Because the bottom hooks 170 are attached to the same structure as the upper bearing race 102, the bottom hooks 170 are also lifted upwardly. This transmits the tensile force on the core elements 85 in the cable portions 126 to the core elements 85 in the cable portions 53. This force is transmitted in turn to the core element 85 in the cable section 55 which in turn operates the calipers 86 and 88 of the rear brake 40.

When the rear brake lever 160 is released, tension on the core elements 85 is relaxed throughout the entire length of the rear brake cable 46. The spring in the rear brake 40 thereupon retracts the brake pads 90 from the wheel rim 92 of the rear wheel 14.

The handlebar stem 26 is located above the upper cable stop 110 and is formed of an elongated block of metal 130 having a split, cylindrical, vertical opening 132 therethrough to receive the threadless steering tube 24. A vertical slot or gap 134 is defined between the rearwardly directed gripping lugs 131 of the block 130 adjacent the vertical opening 132 therethrough. A pair of transverse clamping bolts 136 having threaded shanks are seated in one of the gripping lugs 131 of the block 130 and extend transversely across the vertical slot 134 and are engaged in aligned, internally tapped openings in the other gripping lug 131 of the block 130 to span the slot 134.

The vertical opening 132 in the block 130 is of a size that snugly receives the upper extremity of the steering tube 24 that protrudes above the level of the head tube 18. The clamping bolts 136 can be tightened to clamp the stem 26 onto the upwardly protruding extremity of the steering tube 24.

The stem 26 is also comprised of a generally square, vertically disposed block 138 at the front of the elongated block 130. The block 138 is attached to the block 130 by means of four horizontally oriented, rearwardly directed clamping bolts 136. Horizontally oriented, vertically aligned, semicylindrical grooves are defined across the forwardly facing vertical surface of the block 130 and across the rearwardly facing vertical surface of the block 138. Together, the semicylindrical grooves define a transverse cylindrical passageway 140 adapted to receive the tube stock that forms the handlebars 28 and 30. The clamping bolts 136 are seated in depressions in the rear face of the block 138. The shanks of the clamping bolts 136 are engaged in internally tapped, aligned openings in the front portion of the block 130.

The block 138 can be removed from its position abutting the block 130 to allow the center of the tube stock forming the handlebars 28 and 30 to be placed therebetween. The block 138 is then replaced and the clamping bolts 136 are directed through smooth walled bores in the block 138 and are threadably engaged with the aligned, internally tapped openings in the facing structure of the front portion of the block 130. When the clamping bolts 136 are tightened, the block 138 is pulled tightly against the block 130 thereby tightly gripping therebetween the tube stock forming the handlebars 28 and 30. The handlebar stem 26 thereby is disposed to extend radially outwardly in a forward direction from the portion of the threadless steering tube 24 that protrudes above the upper edge 62 at the top end 62 of the head tube 18. The handlebar stem 26 thereby carries the set of steering handlebars 28 and 30.

The preloading and cable routing assembly 32 includes an annular top cap 142 which is formed of rigid plastic. The top cap 142 has a central, axial opening 144 defined therethrough. The opening 144 defines an upwardly facing bolt head seat therein. The top cap 142 includes a radially, outwardly directed, annular flange 146 that extends out over the upper surface of the stem block 130 adjacent the vertical, cylindrical opening 132 therethrough. The radial flange 146 bears longitudinally against the handlebar stem 26. The top cap 142 also includes a cylindrical, annular portion 148 extending downwardly from the flange 146.

The preloading and cable routing assembly 32 employs an annular wedging element in the form of a star fangled nut 150. The star fangled nut 150 is disposed within the steering tube 24 beneath the cap 142. The star fangled nut 150 is formed with a central, internally threaded, cylindrical barrel 152. At the top and bottom of the barrel 152 there are a pair of concave, upwardly facing metal sheets with radial divisions therein that define a plurality of radially outwardly projecting flanges 153. The flanges 153 have a slight upward and outward inclination.

The preloading and cable routing assembly 32 also includes a vertically oriented draw bolt 154 that has a threaded shank 157 that is threadably engaged with the interiorly threaded barrel 152 of the star fangled nut 150. The axial center of the draw bolt 154 is hollowed out to form a cylindrical, vertical passageway 156. The draw bolt 154 has a head 155 seated on a shoulder defined at the upper end of the axial opening 144 in the top cap 142. The top of the vertical passageway 156 is configured with a hexagonal cross section so as to receive an allen head wrench therein.

A longitudinal preloading force is applied on the handlebar stem 26 by the preloading and cable routing assembly 32 to urge the handlebar stem 26 toward the head tube 18 before the clamping bolts 136 that join the rearwardly extending lugs 131 of the block 130 behind the vertical opening 132 are tightened. The preloading force applied by the preloading and cable routing assembly 32 urges the handlebar stem 26 toward the head tube 18.

The stem 26 is first positioned atop the head tube 18 with the threadless steering tube 24 extending up through the opening 132 in the block 130 and with the clamping bolts 136 in the lugs 131 loosened. The preload is then applied by directing the shank 157 of the draw bolt 154 through the opening 144 in the top cap 142 and threadably engaging the shank 157 of the draw bolt 154 in the internally tapped, vertical opening in the barrel 152 of the star fangled nut 150. The top cap 142 is then pressed down so that the flange 146 thereof resides in direct contact with and bears downwardly against the structure of the stem 26 immediately adjacent the opening 132 in the block 130.

As the bolt 154 is tightened, the increased pressure forcing the star fangled nut 150 upwardly causes the flanges 153 of the metal plates above and below the barrel 152 to assume an orientation more nearly perpendicular to the axis of the barrel 152. The flanges 153 deflect radially outwardly to a greater extent so as to exert a radially outwardly directed force on the interior of the steering tube 24. The ends of the flanges 153 thereby frictionally engage and grip the interior wall surface 27 of the threadless steering tube 24 and immobilize the preloading assembly 32 relative thereto. As this frictional grip increases, further tightening of the bolt 154 causes the flange 146 of the top cap 142 to exert a downwardly directed preloading force on the handlebar stem 26. This force urges the handlebar stem 26 toward the head tube 18.

Once the bolt 154 has been fully tightened into the star fangled nut 150, the clamping bolts 136 joining the lugs 131 of the metal block 130 are thereupon tightened so as to narrow the gap 134 therebetween and tightly clamp the portion of the threadless steering tube 24 that protrudes above the head tube 18 within the opening 132. The clamping bolts 136 thereby serve as a clamping means on the handlebar stem 26 which is arranged to clamp the handlebar stem 26 with a radially inward force onto the smooth outer surface 25 of the portion of the threadless steering tube 24 that protrudes above the head tube 18.

The front brake control 36 is identical to the rear brake control 34 and is mounted on the opposite handlebar 30.

That is, the front brake control 36 includes a stationary element 158 attached to the handlebar 30 and a brake control lever 160 mounted for rotation relative thereto. The front brake cable 44 includes a core element 60 formed of a plurality of twisted, stainless steel wires that extends from the front brake control 36 down through the preloading and cable routing assembly 32, through the hollow steering tube 24 to the front wheel brake 38. The front wheel brake 38 is mounted on the front fork 22 in which the front bicycle wheel 12 is mounted, as best depicted in FIG. 4.

In the embodiment of FIGS. 1–6 the steering tube 24 is provided with a lower end plug 178. The end plug 178 is disposed in the steering tube 24 adjacent the front wheel fork 22. The end plug 178 fits into the opening of the steering tube 24 and defines a radially outwardly projecting bearing edge that resides in abutment against the annular lower edge of the threadless steering tube 24, as illustrated in FIG. 4. A longitudinal opening 179, wider at the bottom than at the top, is defined through the lower end plug 178. The opening 179 is formed off axis from the steering tube 24 so as to provide clearance for the front brake cable relative to the transverse brake mounting pin 23.

In the embodiment of FIGS. 1–6 the front brake cable 44 is comprised of a flexible, tubular sheath divided into an upper segment 56 and a lower segment 58. The sheath segments 56 and 58 surround an inextensible core 60 that is formed of a plurality of twisted, stainless steel wires. The core 60 is movable longitudinally within the sheath segments 56 and 58.

The upper sheath segment 58 is secured to the front wheel brake control 36 and to the preloading and cable routing assembly 32. Specifically, the lower extremity of the sheath segment 56 seats snugly into abutment in the hexagonal well defined in the head of the draw bolt 154. The core 60 continues on downwardly through the axial passageway 156 defined throughout the length of the draw bolt 154 and on down into the interior of the steering tube 24.

The upper extremity of the sheath segment 58 is seated in the lower, broader portion of the opening 179 through the end plug 178. The opening 179 is of stepped configuration. The diameter of the upper portion of the opening 179 is narrower than the diameter at the lower portion thereof so that the end of the sheath section 58 resides in abutment against the structure of the end plug 178, snugly seated in the lower portion of the opening 179. The upper portion of the opening 179 is wide enough, however, to permit free reciprocal movement of the inextensible brake cable core 60 that is movable longitudinally within the sheath sections 56 and 58.

The upper sheath segment 56 is secured to the stationary member 158 of the front brake control 36 and to the preloading and cable routing assembly 32. The lower sheath segment 58 is secured to the steering tube lower end plug 178 and to the brake caliper 86 of the front wheel brake 38. The inextensible core 60 is coupled at its opposite ends to the front brake control engagement lever 160 of the front brake control 36 and to the caliper 88 of the front wheel brake 38.

The draw bolt 154 is hollow and defines a longitudinal opening 156 that is the longitudinal opening through the preloading assembly 32 through which the core element 60 of the front brake cable 44 extends. The front wheel brake cable core 60 thereby passes longitudinally through the hollow draw bolt 154 and through the hollow steering tube 24.

Between the locations at which the upper sheath segment 56 terminates in the head 155 of the bolt 154 and the end of the lower sheath segment 58 that terminates in the opening 179 of the end plug 178, the core 60 of the front brake cable 44 is surrounded by a very thin thermoplastic protector sleeve 181. The outer diameters of the upper and lower cable sheath segments 56 and 58 are equal and are about 0.240 inches. The outer diameter of the protector sleeve 181 is preferably about 0.125 inches. The wall thickness of the protector sleeve is preferably about 0.015 inches. The protector sleeve 181 extends up into the passageway 156 about the brake cable core 60. The protector sleeve 181 encircles and protects the portion of the brake cable core 60 within the hollow steering tube 24 between the end termination of the upper and lower sheath segments 56 and 58.

The purpose of the protector sleeve 181 is to prevent any portion of the cable core 60 from coming into contact with any hard surfaces within the preloading and cable routing assembly 32, the steering tube 24, or the end plug 178. By surrounding this portion of the cable core 60 with a thin, plastic protector sleeve 181, a safeguard is provided against abrasion of the core 60 within the steering tube 24.

The front brake control 36 operates the front wheel brake 38 by movement of the core 60 longitudinally within the sheath segments 56 and 58 and within the longitudinal opening 156 in the preloading assembly 32 and the longitudinal opening 179 in the steering tube lower end plug 178.

With the system of the invention, both the front brake cable 44 and the rear brake cable 46 are routed in such a manner that the steering assembly 20 can be completely rotated relative to the bicycle frame 16 and relative to the head tube 18 that forms a part of the frame 16. The free rotation of the bearing race 104 relative to the bearing race 102 ensures that there is no interference between the rear brake cable 46 and the frame 16. Similarly, since the front brake cable 44 is routed down through the hollow, threadless steering tube 24 to the front wheel brake 38, there is no interference between the front brake cable 44 and the frame 16 either.

FIGS. 7 and 8 illustrate an alternative embodiment of the invention. Elements which are the same in the embodiment of FIGS. 7 and 8 bear the same reference numbers as in drawing FIGS. 1–6. The embodiment of FIGS. 7 and 8 is similar in many respect to the embodiment of FIGS. 1–6, but differs in the construction of the front wheel brake cable and the preloading and cable routing assembly.

In the embodiment of FIGS. 7–8, the preloading and cable routing assembly 190 has a cap nut 192 which is formed with a radial flange 194 that bears longitudinally against the handlebar stem 26. The cap nut 192 also defines an internally threaded cylindrical annular portion 195 depending downwardly from the flange 194 and formed with an outer diameter less than the internal diameter of the threadless steering tube 24. The cap nut 190 thereby defines an axial, longitudinal opening 196 therethrough.

An annular wedging assembly 198 is located within the steering tube 24 at the upper end thereof and defines a central, axial, longitudinal passageway 200 therethrough. The wedging assembly 198 engages with the cap nut 192 so that advancement of the wedging assembly 198 toward the cap nut 192 causes the preloading assembly 190 to exert a radially outwardly directed force on the interior wall 27 of the steering tube 24. The wedging assembly 198 thereby frictionally grips the steering tube 24 and immobilizes the preloading and cable routing assembly 190 relative thereto.

The wedging assembly 198 is comprised of an annular, inner, rigid draw pin 202 that defines the longitudinal passageway 200 therethrough axially down its center. The upper end of the draw pin 202 is externally threaded and is threadably engaged with interior threads defined on the cylindrical, annular portion 195 of the cap nut 192. The lower end of the draw pin 202 is formed with a frusto-conical outer surface.

The wedging assembly 198 also includes an expansion plug 204, formed in the shape of an inverted, annular cup with an axial opening at its center. The expansion plug 204 is formed of a stiff but somewhat resilient material. The disk-shaped upper end 206 of the expansion plug resides beneath the cap nut 192 in longitudinal bearing relationship relative to the lower end of the depending portion 195 thereof. The lower end 208 of the expansion plug 204 forms an annular skirt disposed radially about the lower frusto-conical end of the draw pin 202. The lower end of the rigid draw pin 202 is longitudinally splined to engage ribs formed on the inwardly facing surface of the expansion plug 204. Thus, the draw pin 202 cannot rotate relative to the expansion plug 204, but can move longitudinally relative thereto. An annular thrust washer 210 is disposed between the upper end 206 of the expansion plug 204 and the lower edge of the depending portion 195 of the cap nut 192.

Spaced depressions 212 are defined in the upwardly facing surface of the cap nut 192. The depressions 212 are engagable by means of a spanner wrench. To tighten the preloading and cable routing assembly 190, a spanner wrench is engaged in the depressions 212 and the cap nut 192 is thereby turned in rotation relative to the stem 26 and relative to the steering tube 24. As the top cap nut 192 is rotated, the engagement between the threads on the depending portion 195 thereof and the threads on the upper end of the draw pin 202 pull the draw pin 202 upwardly toward the top cap nut 192. The thrust washer 210 permits the top cap nut 192 to rotate freely relative to the expansion plug 204 so that the expansion plug 204 remains in frictional engagement with the interior, cylindrical wall of the steering tube 24.

As the draw pin 202 is pulled upwardly toward the top cap nut 192, the frusto-conical surface of the draw pin 202 forces the annular skirt 208 of the expansion plug 204 outwardly to a greater extent, thereby producing an outward radial force by the expansion plug 204 against the interior wall 27 of the steering tube 24. This enhances the frictional engagement and locks the preloading assembly 190 against the interior surface 27 at the upper end of the steering tube 24.

In the embodiment of FIGS. 7 and 8 the front brake cable 216 is formed of a single, elongated, inextensible core 220 of twisted stainless steel wires surrounded by a single, uninterrupted, annular, plastic sheath 222. The sheath 222 is secured relative to the longitudinal passage 200 in the draw pin 202 of the preloading and cable routing assembly 190 by virtue of its connection at its opposite ends to the front hand brake control 36 and to the brake caliper 86 in the manner previously described. The core 220 is reciprocally movable longitudinally within the sheath 222 and within the longitudinal passageway 200 through the preloading assembly 190.

By constructing the preloading and cable routing assembly 190 as depicted in FIGS. 7 and 8, it is possible to create a longitudinal passageway 200 in the preloading assembly 190 that is considerably larger in diameter than the passageway 156 that extends the length of the draw bolt 154 in the embodiment of FIGS. 1–6. The wider passageway 200 thereby permits the sheath 222 of the front brake cable 216 to extend all the way from the front brake control 36 to the front wheel brake 38. In this embodiment no end plug is necessary at the lower extremity of the steering tube 24 since the sheath of the front brake cable is not divided into segments but rather is continuous from the front brake control 36 to the front wheel brake 38.

Undoubtedly, numerous variations and modifications of the invention will become readily apparent to those familiar with the construction of bicycles. For example, the embodiment of FIGS. 1–6 could be modified to provide an off-center opening through the cap nut 142 rather than hollowing out the bolt 154. With such an embodiment the front wheel brake cable core 60 would pass longitudinally between the flanges 153 of the star fangled nut 150. Also, the draw bolt 154 which is rotatable relative to the top cap 142 to pull the star fangled nut 150 upwardly may be constructed to pull the star fangled nut 150 into contact against the lower portion 148 of the top cap 142. The bolt 154 can then be tightened with an allen head wrench to draw the star fangled nut 150 upwardly against the abutting face of the cylindrical portion 148 of the top cap 142 to achieve the radial pressure desired. Other variations and modifications of the invention are also possible.

Accordingly, the scope of the invention should not be construed as limited to the specific embodiments thereof illustrated and described.

We claim:

1. In combination a hollow bicycle head tube having a top end and a bottom end, a bicycle front wheel fork having a hollow steering tube with a smooth, threadless, outer surface and a hollow, inner surface and secured to and extending upwardly from the upper extremity of said front wheel fork, and wherein said front wheel fork resides beneath said bottom end of said head tube and said steering tube extends up through said head tube and a portion of said steering tube protrudes above said top end of said head tube, upper and lower steering bearings respectively interposed between said steering tube and said head tube at said upper and lower ends thereof, whereby said steering tube is freely rotatable on said steering bearings relative to said head tube, a pair of diametrically opposed lower fixed brake cable termination ears secured to the outside of said head tube, front and rear wheel brakes each having a pair of brake calipers, a rear brake cable operating segment having a single brake operating end termination and a pair of control coupling end terminations and having a hollow operating segment sheath element and an operating segment core element movable longitudinally within said operating segment sheath element, wherein said operating segment sheath element is secured at said brake operating end termination to one rear brake caliper in said pair of rear brake calipers and at said control coupling end terminations to said lower fixed brake cable termination ears, and said operating segment core element is secured at said brake operating end termination to the other brake caliper in said pair of rear brake calipers, and further including a pair of diametrically opposed upper brake cable termination ears longitudinally immobilized on said steering tube and rotatable therewith relative to said head tube, a handlebar stem disposed to extend radially outwardly from said portion of said steering tube that protrudes above said top end of said head tube, a set of steering handlebars carried by said handlebar stem, a preloading assembly secured to said steering tube at the upper extremity of said inner surface thereof and extending outwardly therefrom above said handlebar stem so as to exert a longitudinal preloading force on said handlebar stem urging said handlebar stem toward said head tube, clamping means on said handlebar stem arranged to clamp said handlebar stem with a radially inward force onto said smooth outer surface of said portion of said steering tube that protrudes above said head tube, a rear brake operating control mounted on said set of steering handlebars and including a rear brake stationary member secured to said handlebars and a rear brake operating lever mounted for rotational movement relative to said rear brake stationary member, a rear brake cable control segment having a single brake control end termination and a pair of operating end coupling terminations and having a hollow control segment sheath element and a control segment core element movable longitudinally within said control segment sheath element, wherein said control segment sheath element is secured at said brake control end termination to said stationary member of said rear brake operating control and at said operating end coupling terminations to said upper brake cable termination ears, and said control segment core element is secured at said brake control end termination to said rear brake operating lever of said rear brake operating control, and further including a coupling rotor assembly disposed coaxially about said head tube and having an upper non-rotatable bearing race ring with a pair of diametrically opposed coupling flanges depending therefrom and extending radially outwardly from said head tube and to which said operating segment core element is secured at said control coupling end terminations of said rear brake cable operating segment, a lower, rotatable bearing race disposed beneath said upper nonrotatable bearing race and having a pair of coupling tabs projecting radially outwardly therefrom in longitudinal alignment with said upper brake cable termination ears wherein said control segment core element is secured to said coupling tabs at said operating coupling end terminations of said rear brake cable control segment, a plurality of bearings disposed between said bearing races of said rotor assembly, a front brake control mounted on said set of steering handlebars and a front brake cable assembly including a core element that extends from said front brake control down through said preloading assembly and through said hollow steering tube to said front wheel brake, whereby said preloading assembly exerts a longitudinal force on said upper and lower steering bearings and also serves as a cable routing assembly.

2. A combination according to claim 1 wherein said preloading assembly defines a longitudinal passageway therethrough through which at least said front brake cable core element passes and within which said front brake cable core element is longitudinally reciprocal, and said front brake cable assembly further includes a front brake cable sheath element that is secured relative to said preloading assembly.

3. A combination according to claim 2 wherein said front brake cable sheath element is divided into upper and lower segments with a gap therebetween at said longitudinal passageway through said preloading assembly.

4. In a bicycle having a hollow, cylindrical, annular bicycle frame head tube, a front wheel fork, a hollow, threadless steering tube secured atop said front wheel fork and projecting upwardly through said head tube and protruding above the top of said head tube, head tube bearings interposed between said head tube and said steering tube, a handlebar stem, a set of handlebars carried by said handlebar stem, a preloading assembly secured to the top of said threadless steering tube and exerting a longitudinally downward force on said handle bar stem toward said front wheel fork, front and rear brake controls mounted on said handlebars, front and rear wheel brakes, and front and rear brake cables leading respectively from said front and rear brake controls to said front and rear wheel brakes, the improvement comprising a brake cable coupling system which divides said rear brake cable into a rear brake control portion that is secured to said rear brake control and to said steering tube and a rear brake operating portion that is secured to said rear wheel brake and to said head tube, wherein said brake cable coupling system includes rotatable means connected to said rear brake control portion and secured to said steering tube and nonrotatable means connected to said rear brake operating portion and secured to said head tube, and said rotatable means is connected to said nonrotatable means through an annular bearing mechanism disposed concentrically about and externally of said head tube and said steering tube, and said front brake cable is comprised of a flexible, tubular sheath surrounding an inextensible core that is movable longitudinally within said sheath and which is attached to said front brake control and to said front wheel brake at its opposite ends, and further characterized in that said preloading assembly has a longitudinal passageway therethrough and said front brake cable passes longitudinally through said steering tube and longitudinally through said longitudinal passageway in said preloading assembly, and wherein said preloading assembly includes a cap nut having a radial flange that bears longitudinally against said handlebar stem and which has a longitudinal opening therethrough, and an annular wedging assembly defining said longitudinal passageway therethrough disposed within said steering tube and engaged with said cap nut, whereby advancement of said wedging assembly toward said cap nut causes said preloading assembly to exert a radially outwardly directed force on the interior of said steering tube to thereby frictionally grip said steering tube and immobilize said preloading assembly relative thereto, and said front brake cable passes through said longitudinal opening in said cap nut and through said longitudinal passageway defined in said annular wedging assembly, and said preloading assembly exerts a longitudinal preloading force on said head tube bearings and also serves as a cable routing assembly.

5. A bicycle according to claim 4 wherein said wedging assembly is comprised of an annular inner rigid draw pin, the upper end of which is externally threaded and threadably engaged with said cap nut and the lower end of which has a frusto-conical outer surface, and a resilient, annular expansion plug disposed concentrically about said draw pin, the upper end of said expansion plug residing inwardly beneath said cap nut in longitudinal bearing relationship relative thereto, and the lower end of said expansion plug forming a skirt disposed radially about said lower end of said draw pin.

6. A bicycle according to claim 5 wherein said draw pin is keyed to said expansion plug to prohibit relative rotation and to permit longitudinal movement therebetween and further comprising an annular thrust washer disposed between said upper end of said expansion plug and said cap nut.

7. In a bicycle having a hollow, cylindrical, annular bicycle frame head tube, a front wheel fork, a hollow, threadless steering tube secured atop said front wheel fork and projecting upwardly through said head tube and protruding above the top of said head tube, head tube bearings interposed between said head tube and said steering tube, a handlebar stem, a set of handlebars carried by said handlebar stem, a preloading assembly secured to the top of said threadless steering tube and exerting a longitudinally downward force on said handle bar stem toward said front wheel fork, front and rear brake controls mounted on said handlebars, front and rear wheel brakes, and front and rear brake cables leading respectively from said front and rear brake controls to said front and rear wheel brakes, the improvement comprising a brake cable coupling system which divides said rear brake cable into a rear brake control portion that is secured to said rear brake control and to said steering tube and a rear brake operating portion that is secured to said rear wheel brake and to said head tube, wherein said brake cable coupling system includes rotatable means connected to said rear brake control portion and secured to said steering tube and nonrotatable means connected to said rear brake operating portion and secured to said head tube, and said rotatable means is connected to said nonrotatable means through an annular bearing mechanism disposed concentrically about and externally of said head tube and said steering tube, and further characterized in that said preloading assembly has a longitudinal passageway therethrough and said front brake cable passes longitudinally through said steering tube and longitudinally through said longitudinal passageway in said preloading assembly, and further comprising a steering tube lower end plug with a longitudinal opening defined therethrough disposed in said steering tube adjacent said front wheel fork and further characterized in that said front brake cable is comprised of a tubular sheath divided into upper and lower sheath segments surrounding an inextensible core that is movable longitudinally within said sheath, and wherein said upper sheath segment is secured to said front brake control and to said preloading assembly and said lower sheath segment is secured to said steering tube lower end plug and to said front wheel brake, and said inextensible core is coupled at its opposite ends to said front brake control and to said front wheel brake so as to allow said front brake control to operate said front wheel brake by moving longitudinally within said sheath segments and within said longitudinal opening in said steering tube lower end plug and within said longitudinal passageway in said preloading assembly and wherein said preloading assembly is comprised of an annular cap having a radial flange that bears longitudinally against said handlebar stem, an annular wedging element disposed within said steering tube beneath said cap, and a draw bolt having a head seated in the top of said cap and a shank threadably engaged with said wedging element, whereby said draw bolt is rotatable relative to said top cap to cause said wedging element to exert a radially outwardly directed force on the interior of said steering tube to thereby frictionally grip said steering tube and immobilize said preloading assembly relative thereto, and further characterized in that said draw bolt is hollow and defines said longitudinal passageway through said preloading assembly, and said front wheel brake cable core passes longitudinally through said hollow draw bolt, and said preloading assembly exerts a longitudinal preloading force on said head tube bearings and also serves as a cable routing assembly.

8. In a bicycle having a hollow, cylindrical, annular bicycle frame head tube, a front wheel fork, a hollow, threadless steering tube secured atop said front wheel fork and projecting upwardly through said head tube and protruding above the top of said head tube, upper and lower headset bearings interposed between said head tube and said threadless steering tube, a handlebar stem, a set of handlebars carried by said handlebar stem, a preloading assembly secured to said threadless steering tube above said head tube and exerting a longitudinally downward force on said handle bar stem toward said front wheel fork, front and rear brake controls mounted on said handlebars, front and rear wheel brakes, and front and rear brake cables leading respectively from said front and rear brake controls to said front and rear wheel brakes, the improvement comprising a rotatable brake cable coupling system mounted on said head tube and including a rotor assembly that divides said rear brake cable into a control segment secured to said rear brake control and to said steering tube and an operating segment secured to said head tube and to said rear wheel brake and further characterized in that said preloading assembly has a longitudinal passageway therethrough and said front brake cable is routed through said longitudinal passageway in said preloading assembly and through said hollow threadless steering tube from said front brake control to said front wheel brake, whereby said front wheel fork, said steering tube, said handlebar stem, said handlebars, said rear brake cable control segment and said front brake cable are all freely rotatable together relative to said head tube and relative to said rear brake cable operating segment, and said preloading assembly defines a longitudinal passageway therethrough and said front brake cable is comprised of a sheath that is secured relative to said longitudinal passageway and an inextensible core that is reciprocally movable longitudinally within said sheath and within said longitudinal passageway through said preloading assembly, and said preloading assembly includes a cap nut having a radial flange that bears longitudinally against said handlebar stem and which has a longitudinal opening therethrough, and an annular wedging assembly defining said longitudinal passageway therethrough disposed within said steering tube and engaged with said cap nut, whereby advancement of said wedging assembly toward said cap nut causes said preloading assembly to exert a radially outwardly directed force on the interior of said steering tube to thereby frictionally grip said steering tube and immobilize said preloading assembly relative thereto, and said front brake cable passes through said longitudinal opening in said cap nut and longitudinally through said longitudinal passageway defined through said annular wedging assembly, and said preloading assembly exerts a longitudinal force on said headset bearings and also serves as a cable routing assembly.

9. A bicycle according to claim 8 wherein said wedging assembly is comprised of an annular inner rigid draw pin that defines said longitudinal passageway axially therethrough, the upper end of which is externally threaded and threadably engaged with said cap nut and the lower end of which has a frusto-conical outer surface, and a resilient, annular expansion plug, the upper end of which resides beneath said cap nut in longitudinal bearing relationship relative thereto, and the lower end of which forms a skirt disposed radially about said lower end of said draw pin.

10. A bicycle according to claim 9 further comprising rotation inhibiting means that prohibits relative rotation and permits longitudinal movement between said draw pin and said expansion-plug and further comprising an annular thrust washer disposed between said upper end of said expansion plug and said cap nut.

11. In a bicycle having a hollow, cylindrical, annular bicycle frame head tube, a front wheel fork, a hollow, threadless steering tube secured atop said front wheel fork and projecting upwardly through said head tube and protruding above the top of said head tube, upper and lower headset bearings interposed between said head tube and said threadless steering tube, a handlebar stem, a set of handlebars carried by said handlebar stem, a preloading assembly secured to said threadless steering tube above said head tube and exerting a longitudinally downward force on said handle bar stem toward said front wheel fork, front and rear brake controls mounted on said handlebars, front and rear wheel brakes, and front and rear brake cables leading respectively from said front and rear brake controls to said front and rear wheel brakes, the improvement comprising a rotatable brake cable coupling system mounted on said head tube and including a rotor assembly that divides said rear brake cable into a control segment secured to said rear brake control and to said steering tube and an operating segment secured to said head tube and to said rear wheel brake and further characterized in that said preloading assembly has a longitudinal passageway therethrough and said front brake cable is routed through said longitudinal passageway in said preloading assembly and through said hollow threadless steering tube from said front brake control to said front wheel brake, whereby said front wheel fork, said steering tube, said handlebar stem, said handlebars, said rear brake cable control segment and said front brake cable are all freely rotatable together relative to said head tube and relative to said rear brake cable operating segment, and further comprising a steering tube lower end plug with a longitudinal opening defined therethrough disposed in said steering tube adjacent said front wheel fork and further characterized in that said front brake cable is comprised of a tubular sheath divided into upper and lower sheath segments surrounding an inextensible core that is movable longitudinally within said sheath, and wherein said upper sheath segment has opposite ends that are respectively anchored to said front brake control and to said preloading assembly and said lower sheath segment has opposite ends that are respectively anchored to said steering tube lower end plug and to said front wheel brake, and said inextensible core has opposite ends respectively coupled to said front brake control and to said front wheel brake so as to allow said front brake control to operate said front wheel brake by moving longitudinally within said sheath segments and within said longitudinal passageway in said preloading assembly, within said steering tube, and within said longitudinal opening in said steering tube lower end plug, and said preloading assembly is comprised of an annular cap having a radial flange that bears longitudinally against said handlebar stem, an annular wedging device disposed within said steering tube beneath said cap, and a draw bolt having a head seated in said top of said cap and a shank extending through said cap and threadably engaged with said wedging device, whereby said draw bolt is rotatable relative to said cap to pull said wedging device toward it to cause said wedging device to exert a radially outwardly directed force on the interior of said steering tube to thereby frictionally grip said steering tube and immobilize said preloading assembly relative thereto, and further characterized in that said draw bolt is hollow and defines said longitudinal passageway through said preloading assembly, and said front brake cable core passes longitudinally through said hollow draw bolt, and said preloading assembly exerts a longitudinal force on said headset bearings and also serves as a cable routing assembly.

* * * * *